United States Patent [19]
Habermehl et al.

[11] Patent Number: 6,074,149
[45] Date of Patent: Jun. 13, 2000

[54] FALSE THREADSCREW AND SCREWSTRIP

[75] Inventors: G. Lyle Habermehl, 436 Calvert Dr., Gallatin, Tenn. 37066; Troy D. Hale, Hendersonville; Robert S. Bartley, Madison, both of Tenn.

[73] Assignee: G. Lyle Habermehl, Gallatin, Tenn.

[21] Appl. No.: 09/343,796

[22] Filed: Jun. 30, 1999

[51] Int. Cl.[7] .............................. F16B 15/08; F16B 35/04
[52] U.S. Cl. ...................... 411/442; 411/412; 411/966; 206/347
[58] Field of Search ..................................... 411/412, 413, 411/442, 443, 444, 966; 206/345, 346, 347

[56] References Cited

U.S. PATENT DOCUMENTS

| | | | |
|---|---|---|---|
| 4,146,071 | 3/1979 | Mueller et al. | 144/32 S |
| 4,167,229 | 9/1979 | Keusch et al. | 206/343 |
| 4,930,630 | 6/1990 | Habermehl | 206/347 |
| 5,568,753 | 10/1996 | Habermehl et al. | 81/434 |
| 5,622,024 | 4/1997 | Habermehl | 411/443 |
| 5,746,039 | 5/1998 | Nystrom | 411/412 X |
| 5,758,768 | 6/1998 | Habermehl et al. | 206/347 |
| 5,816,012 | 10/1998 | Willis | 411/412 X |
| 5,819,609 | 10/1998 | Habermehl | 81/434 |
| 5,870,933 | 2/1999 | Habermehl et al. | 81/434 |

FOREIGN PATENT DOCUMENTS 1040600  10/1978  Canada ...................................... 219/1

Primary Examiner—Neill Wilson
Attorney, Agent, or Firm—Dorsey & Whitney LLP

[57] ABSTRACT

A threaded fastener having a threaded shank with threads on a forward portion of the shank near the tip of greater size than threads on a rear portion of the shank. A collated screwstrip comprising a plastic holding strap holding a plurality of such fasteners in a row in spaced side-by-side relation with the holding strap in threaded engagement with the smaller rear thread portion of each fastener.

21 Claims, 4 Drawing Sheets

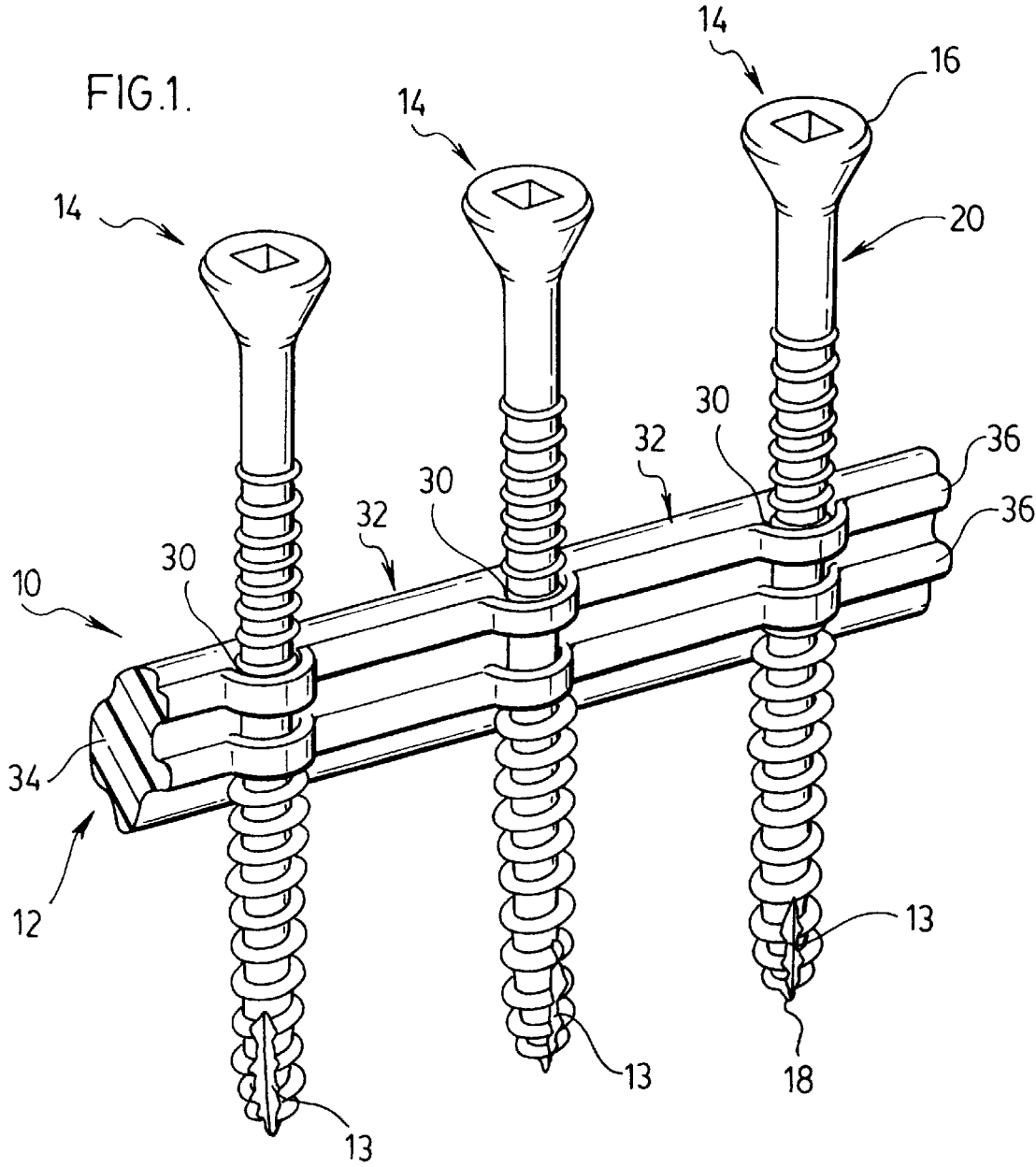

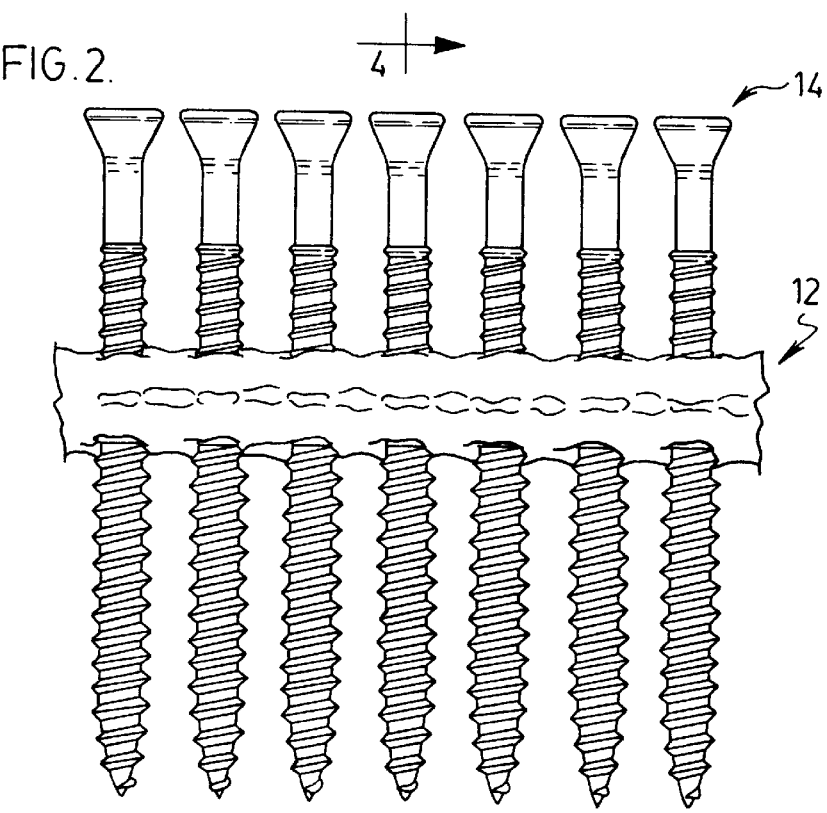
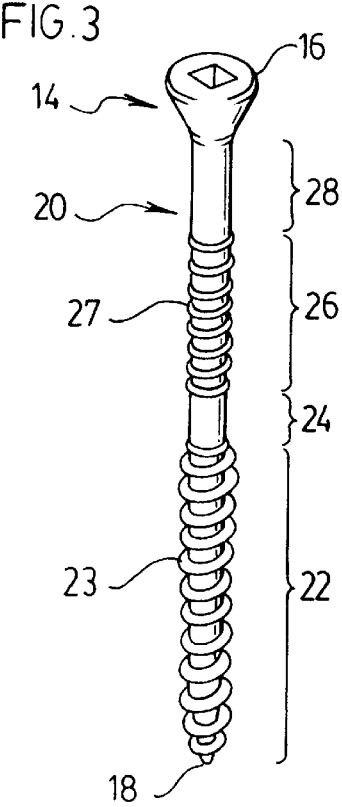
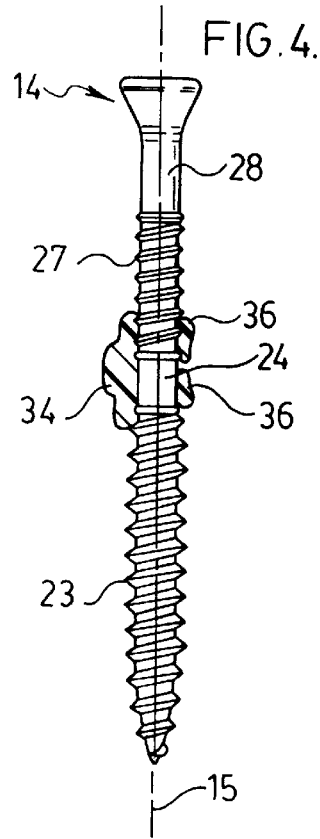

FIG. 6.
FIG. 7.
FIG. 8.
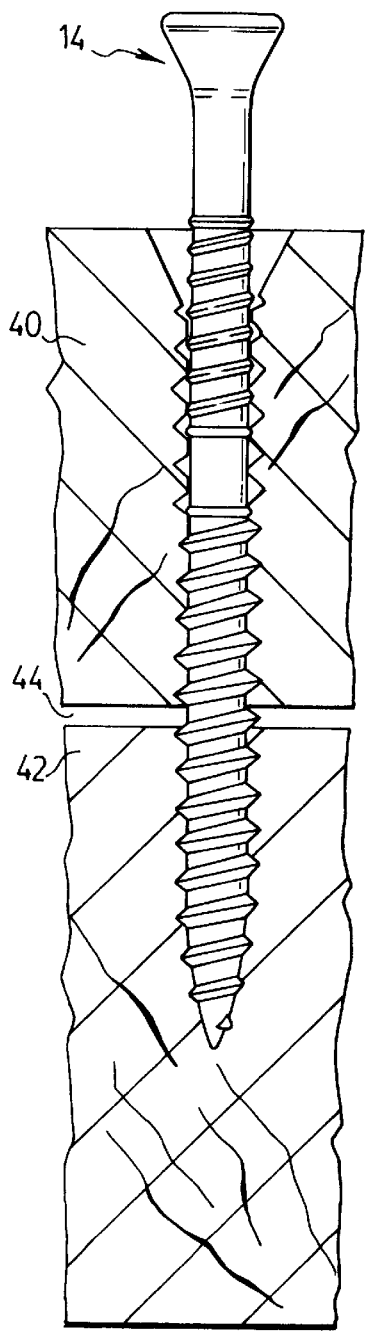
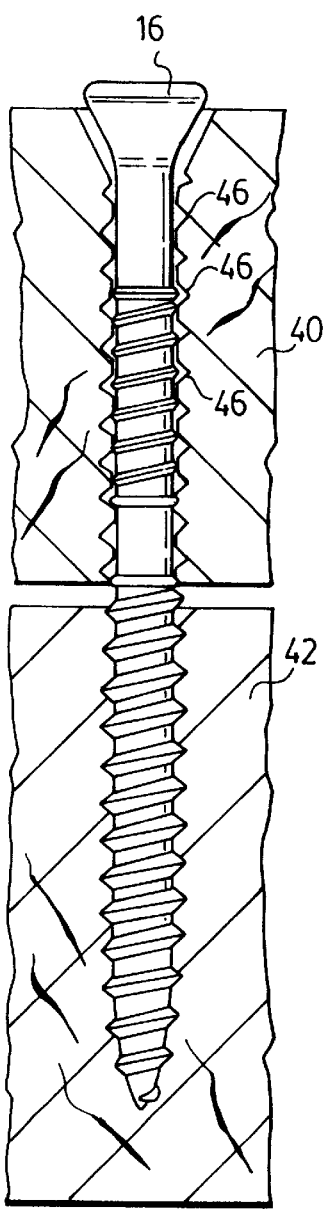
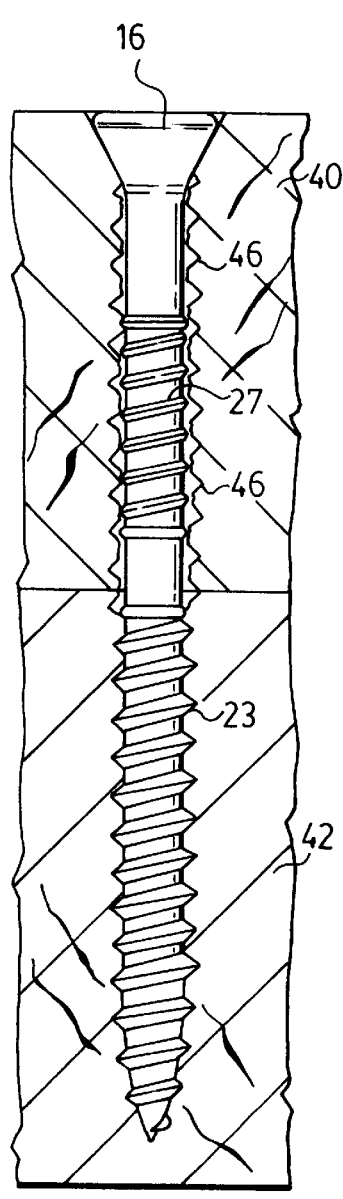

FALSE THREADSCREW AND SCREWSTRIP

SCOPE OF THE INVENTION

This invention relates to collated screwstrips comprising a holding strip made of plastic for retaining a plurality of screws in a row and, more particularly, to a screwstrip which provides screws which facilitate driving of the screws into a workpiece.

BACKGROUND OF THE INVENTION

Screwstrips are known whereby the screws are connected to each other by a retaining belt of plastic material. Screws in such strips are engaged by a bit of a screwdriver and then screwed into the workpiece. In the course of the bit engaging the screw and/or driving the same into the workpiece, the screw becomes detached from the plastic strip.

Known screwstrips of this type are disclosed in Canadian Patent 1,040,600 issued Oct. 17, 1978 to Schwartz, U.S. Pat. No. 4,167,229 to Reich et al, issued Sep. 11, 1979, U.S. Pat. No. 4,930,630 to Habermehl, issued Jun. 5, 1990, U.S. Pat. No. 5,758,768 to Habermehl, issued Jun. 2, 1998 and U.S. Pat. No. 5,819,609 to Habermehl, issued Oct. 13, 1998, the disclosures of which are incorporated herein by reference.

Screws carried by such strips are adapted to be successively incrementally advanced to a position in alignment with and to be engaged by a bit of a reciprocating, rotating power screwdriver and screwed into a workpiece. In the course of the bit engaging the screw and driving it into a workpiece, the screw becomes detached from the plastic strip leaving the strip as a continuous length.

In the use of such collated strips in screwdrivers, the strip serves a function of assisting in guiding the screw into a workpiece and, to accomplish this, the strip is retained against movement towards the workpiece. In the strip, each screw to be driven has its threaded shaft threadably engaged in a threaded sleeve of the strip such that on the screwdriver engaging and rotating each successive screw, the screw turns within the sleeve which acts to guide the screw as it moves forwardly into threaded engagement into the workpiece. Preferably, only after the tip of the screw becomes engaged in the workpiece, does the head of the screw come into contact with the sleeves. Further forward movement of the screw into the workpiece then draws the head downwardly to engage the sleeve and to rupture the sleeve by reason of the forward movement of the head with the strip retained against movement towards the workpiece. The sleeve preferably is configured to have fragible straps which break on the head passing through the sleeve such that strip remains intact as a continuous length. Since the strip is a continuous length, on advancing the strip with each successive screw to be driven, it necessarily results that portions of the strip from which each screw has been driven are also advanced to exit from the power screwdriver.

Known power screwdrivers for driving such collated strips include U.S. Pat. No. 4,146,871 to Mueller, issued Mar. 27, 1976, U.S. Pat. No. 5,568,753 to Habermehl, issued Oct. 29, 1996 and U.S. Pat. No. 5,870,933 to Habermehl, issued Feb. 16, 1999, the disclosures of which are incorporated herein by reference. Such known power screwdrivers include a rotatable and reciprocally moving screwdriver shaft which is turned in rotation by an electric motor. A screwdriving bit forms a forwardmost portion of the shaft for engaging the head of each successive screw as each screw is moved into a driving position, axially aligned under the screwdriver shaft.

Screws are known in which the shaft of the screw is threaded over substantially its entire length with identical threads. The present inventor appreciated that such screws have a number of disadvantages. Firstly, in driving the screws fully into a workpiece such as wood, resistance to driving increases as an increased length of the screw becomes engaged in the workpiece. For example, in hardwood or in almost any wood when long screws are used, the resistance to driving can become substantial and may result in torques being required to advance a screw which exceed the strength in the screw and result in the screw snapping. Secondly, when a screw is used to secure one workpiece to another, once the threads of the screw are engaged in both workpieces, it is not possible to draw the workpieces closer together by tightening the screw unless the thread grooves formed in the workpiece through which the screw passes entirely can be stripped.

Partially threaded screws are known which overcome these disadvantages by having a shank which is not threaded in an intermediate portion of the shank forward of the head and rear of a forward threaded portion. The intermediate portion of the shank typically is cylindrical without any threads thereon or, in some cases, has been known to be provided with a plurality of annular rings, the annular rings which extend radially outwardly an extent less than that of the threads of the forward threaded portion. These plurality of concentric spaced annular rings overlie the smooth shank and provide some increased engagement between the workpiece and the screw rearward of the threads. These rings have the disadvantage of being formed in a separate manufacturing step from the threads. The present inventor has appreciated that difficulties arise with such partially threaded screws including, amongst other things, difficulties with use of these partially threaded screws in collated screwstrips.

One disadvantage arises in that the preferred location for the holding strip to engage the shank is intermediate the head and the tip. However, this is the same location where there is an absence of threads on the partially threaded screws. Having the holding strip engage the screw where there is no threads has been appreciated by the applicant to prevent, on an initial rotation of a screw on engagement with a bit, from causing the screw to advance through the holding strap by threaded engagement between the screw and the holding strap. As well, where the holding strap engages a partially threaded screw which has a smooth cylindrical shank, difficulties arise in the plastic holding strap frictionally engaging the smooth cylindrical shank with sufficient friction to prevent the screws from becoming axially displaced in manufacture and handling of the screwstrip. With partially threaded screws which have the concentric spaced annular rings over the intermediate shank portion, where the holding strap is about such rings, then significant difficulties are experienced in attempting to drive the screw forwardly through the holding strip as the engagement of the concentric rings in the holding strip positively resists such advance.

SUMMARY OF THE INVENTION

To at least partially overcome these disadvantages of the prior art, the present invention provides a fastener having threads over a rear portion of the shank which are smaller than threads over a forward portion of the shank. As well, the present invention provides a screwstrip in which a holding strip engages the shank of the screws over a rear threaded portion of the shank having threads smaller than threads on a forward portion of the shank.

An object of the present invention is to provide an improved fastener which facilitates driving into a workpiece.

Another object is to provide a screwstrip for screws having large threads over only a forward portion of the screw.

Accordingly, in one aspect, the present invention provides a collated screwstrip comprising a plastic holding strip and a plurality of threaded fasteners, each fastener disposed about an axis and having a head at a rear end, a tip extending from the other forward end and a shank extending from below the head to the tip about the axis, the threads about the shank formed as a continuous helix about the shank of constant pitch, the threads having a forward thread portion and a rear thread portion rearward of the forward thread portion, the threads over the forward thread portion being of larger size than the threads over the rear thread portion, the holding strip holding the fasteners in a row in spaced side-by-side relation with the axis of the fasteners in a common plane and the rear thread portion of each screw in threaded engagement with the holding strip.

BRIEF DESCRIPTION OF THE DRAWINGS

Further aspects and advantages of the present invention will appear from the following description taken together with the accompanying drawings in which:

FIG. 1 is a pictorial view of a first side of a screwstrip in accordance with the present invention FIG. 2 is a side view of the second side of the screwstrip of FIG. 1;

FIG. 3 is a pictorial view of one screw of the type used in the screwstrip of FIG. 1;

FIG. 4 is a cross-sectional end view of the screwstrip of FIG. 2 along section line 4–4', FIGS. 6, 7 and 8 are sequential, schematic cross-sectional side views showing the screw of FIG. 5 being driven into two workpieces after the screw has been separated from the holding strap.

DETAILED DESCRIPTION OF THE DRAWINGS

Figure 5:
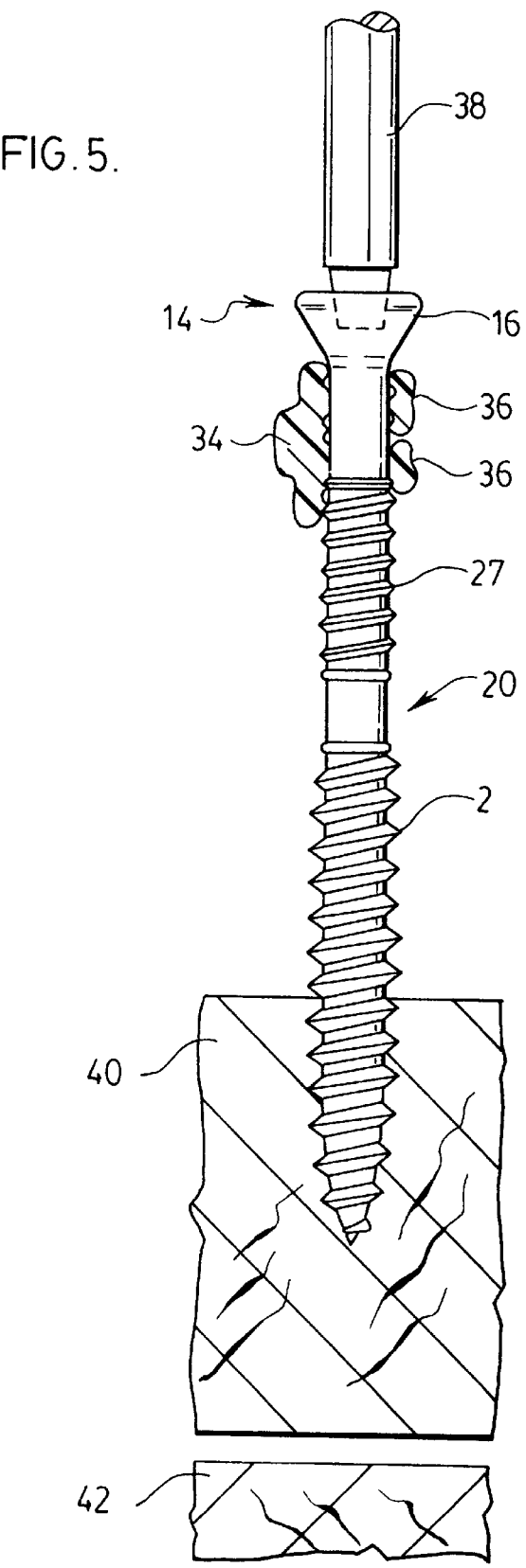
FIG. 5 is a partially cross-sectional end elevation view schematically showing the strip of FIG. 1 with a screw engaged by a screwdriver and being driven into a workpiece to an extent that the head of the screw engages the holding strip.

Reference is made to FIGS. 1 to 4 which show a screwstrip 10 comprising a holding strip 12 preferably of plastic material and a plurality of screws 14 held by the holding strip in spaced side-by-side parallel relation.

Each screw 14 has a head 16, a tip 18 and a shank 20 extending therebetween. The shank 20 has threads formed about it. The shank 20 has a forward thread portion 22 and a rear thread portion 26 rearward of the forward thread portion 22. The shank is shown with a preferred but optional intermediate shank portion 24 between the forward thread portion 22 and the rear thread portion 26. The intermediate shank portion 24 is substantially cylindrical and does not have threads formed thereon. The shank 20 also has a terminal shank portion 28 between the rear thread portion 26 and the head 16. Like the intermediate shank portion 24, the terminal shank portion 28 is preferably not threaded but rather comprises merely the cylindrical shank.

The holding strip 12 is substantially identical to that described in FIG. 13 of U.S. Pat. No. 5,758,768 which is incorporated herein by reference. The strap 12 has a plurality of spaced sleeves 30 which are joined together by lands 32. The sleeves 30 are formed on one common side of the screws by an elongate beam member 34 and on the other common side of the screws by two fragible strap members 36. The strap members 36 bridge the beam member 34 across the shank 20 of the screws.

As shown in FIG. 4, the holding strip 12 engages the screws 14 over the rear thread portion 26 as well as over the intermediate shank portion 24 and partially over the forward thread portion 22.

The forward threads 23 over the forward thread portion 22 are larger than the rear threads 27 over the rear thread portion 26. Preferably, both the forward threads 23 and the rear threads 27 are formed as segments of the same helix about the shank and of a common pitch.

In accordance with the present invention, in driving the screw into a workpiece, after the forward threads 23 have been screwed into a workpiece as, for example, forming thread-forming grooves in the workpiece in doing so, the rear threads 27 can be screwed into the workpiece as through the formed thread grooves in the workpiece with reduced resistance than if the rear threads 27 were identical to the forward threads.

As shown in side view in FIG. 4, the forward threads 23 extend radially outwardly from the axis 15 about which the screw is disposed farther than rear threads 27. The cross-sectional area of the forward threads 23 in a radially extending plane in which the axis 15 lies is greater than the corresponding area of the rear threads 27. As well, it is preferred that the relative cross-sectional profile of forward threads 23 and rear threads 27 in any radially extending plane in which the axis lies, are such that with advance of the screw, the profile of the rear threads 27 lie within the profile occupied by the forward threads 23.

Use of the screwstrip of this invention is schematically illustrated with reference to FIGS. 4 and 5 having regard to the known manner in which known screwstrips are driven by power screwdrivers such as taught by U.S. Pat. No. 5,568,753 to Habermehl.

In use, a screw 14 in the holding strap 12 is fed into a position in axial alignment with a reciprocating and rotating screwdriver bit 38 with the beam member 34 of the holding strap held against movement towards a workpiece 40, the screwdriver bit 38 engages the head 16 of the screw 14 and rotates the screw driving it forwardly into workpiece. By reason of at least the rear threads 27 on the shank 20 being threadably engaged with the holding strap, the screw on rotation is driven downwardly relative the holding strap with the holding strap, in effect, serving to guide the screw into initial engagement with the workpiece. In particular, the engagement of the threads 27 of the rear portion of the thread with the thread grooves formed on the inside surface of the sleeve, threaded engagement on rotation of the screw advances the screw through the holding strap. Further rotation of screw 14 with the screw engaged in both the workpiece and the holding strap draws the screw down into the workpiece until the head 16 of the screw engages the beam member 34 of the holding strap as shown in FIG. 5. With further rotation of the screw with the beam member 34 held against movement towards the workpiece, the head 16 of the screw passes through the holding strap rupturing the fragible straps 36 yet leaving the beam member 34 as a continuous length. Thereafter, the screw is driven fully into the workpiece. FIG. 5 illustrates the screwstrip in use at a time when the head 16 of the screw has been engaged with the beam member 34 and the head is commencing to exert downward pressure on the beam member. Since the screw is captured between the workpiece and the screwdriver bit 38, for the screw to move past the holding strap, the straps 36 must be broken.

In manufacturing the screw 14 shown in FIG. 4, the forward threads 23 and the rear threads 27 may be formed in the same forming step. For example, as a thread die may be provided with one portion to form the rear threads 27 and another portion to form the forward threads 23 simultaneously on relative rotation of the screw within the dies. In manufacturing, it is of assistance to have the intermediate shank portion 24 without threads separate the forward threads 23 from the rear threads 27. However, it is to be appreciated that neither the unthreaded intermediate shank portion 24 nor the unthreaded terminal shank portion 28 are necessary. As well, it is to be appreciated that the forward threads 23 and the rear threads 27 could comprise a continuous helix throughout the length of the shaft without discontinuity.

FIG. 4 shows the forward threads 23 of constant shape over the entirety of the forward thread and, as well, rear threads 27 of identical shape over the entire length of the rear threads. While this can be advantageous to simplify manufacture, it is to be appreciated that the forward and rear threads could be provided to have the size of their threads vary over the axial length of the forward portion or the rear portion. As well, it is to be appreciated that the forward threads 23 and the rear threads 27 could comprise a continuous helical thread with the size of the thread being reduced from the first forward threads into the rear threads.

The screw 14 has been shown with a tapered wood head and a square "Robertson" bit socket. Of course, any type of threaded fasteners could be utilized with various head configurations.

Preferred fasteners for use in accordance with the present invention are screws used to screw decking boards to underlying joists in forming outdoor wooden decks from commercially available lumber. The decking boards are typically about two inches (5 cm) in thickness. The screws are preferably at least 3.25 inches (8 mml) in length. FIGS. 6, 7 and 8 illustrate a wood screw in accordance with the present invention being used to secure two pieces of wood together. FIG. 6 illustrates the screw as having been driven through an upper board 40 and into the lower board 42 with a gap 44 between the boards. Once the head of the screw becomes fully seated in the upper board 40 as shown in FIG. 7, rotating the screw further will, due to engagement of the forward threads in the lower board 42, draw the upper board 40 downwardly to a tightened position as shown in FIG. 8 with the gap 44 between the boards having been eliminated. In tightening the screw from the position of FIG. 7 to the position of FIG. 8, the rear threads 27 become out of phase with the thread grooves 46 formed in the upper board 40 with passage of the forward threads 23 through the upper board 40.

It is to be appreciated that screws in accordance with the present invention may be useful to draw many different types of materials together and it is particularly advantageous when the material over the rear portion of the screw may have a greater strength than the material engaged by the forward portion. As well, screws in accordance with the present invention are advantageous when driving a screw into the same material where the length of the screw increases the torques required to drive the screw fully into the workpiece.

Fasteners in accordance with the present invention preferably are made from metal, however, various other types of fasteners such as those formed of nylon or plastic materials can be used in varying operations.

Fasteners in accordance with the present invention are shown to incorporate at the tip a self drilling or augering and self-tapping configuration which assists each screw 14 in penetrating into a workpiece. The augering tip has axially extending cut-out portions 13 as shown only in FIG. 1, preferably, two cut-out portions at diametrically opposed locations to assist in driving as is known.

Fasteners in accordance with the present invention may include other features without departing from the present invention.

Screwstrips in accordance with the present invention are preferably adapted for use in the screwstrip of the type, for example, shown in U.S. Pat. No. 5,758,768 in which the holding strap has spaced parallel sleeves interconnected by lands 32 extending between the sleeves 30 as a web disposed substantially parallel a plane containing axes 15 of all the fasteners. However, fasteners in accordance with the present invention can also be used in other screwstrips such as those in which the web may extend radially relative the axis 15 of the fasteners.

The invention has been described with reference to preferred embodiments. Many modifications and variations will now occur to persons skilled in the art. For a definition of the invention, reference is made to the appended claims.

We claim:

1. A collated screwstrip comprising a plastic holding strip and a plurality of threaded fasteners, each fastener disposed about an axis and having a head at a rear end, a tip extending from the other forward end and a shank extending from below the head to the tip about the axis, threads about the shank formed as at least portions of a helix about the shank of constant pitch, the threads having a forward thread portion and a rear thread portion rearward of the forward thread portion, the threads over the forward thread portion being of larger size than the threads over the rear thread portion, the holding strip holding the fasteners in a row in spaced side-by-side relation with the axis of the fasteners in a common plane and the rear thread portion of each screw in threaded engagement with the holding strip.

2. A screwstrip as claimed in claim 1 wherein the threads over the forward thread portion extend radially outwardly relative the axis a greater distance than the threads over the rear thread portion.

3. A screwstrip as claimed in claim 1 wherein the threads over the forward thread portion have a cross-sectional area in any plane including the axis which is greater than a cross-sectional area of the threads over the rear thread portion in any plane including the axis.

4. A screwstrip as claimed in claim 1 wherein the threads have a cross-sectional profile in a radially extending plane in which the axis lies, the cross-sectional profile of the rear thread portion lying within the cross-sectional profile of the forward thread portion.

5. A screwstrip as claimed in claim 1 wherein the strip comprises spaced parallel sleeves interconnected by lands with one of the fasteners received in each sleeve with threaded engagement between the sleeve and the rear thread portion.

6. A screwstrip as claimed in claim 5 wherein the lands extend between the sleeves as a web which extend both between adjacent sleeves and axially of the fasteners.

7. A screwstrip as claimed in claim 6 wherein the web is disposed substantially about a plane parallel a plane containing axes of all the fasteners.

8. A screwstrip as claimed in claim 5 wherein the sleeves have thread grooves formed in inwardly directed surfaces of the sleeves and engaging with the threads of the fastener over the second thread portion.

9. A screwstrip as claimed in claim 5 wherein the sleeves have a reduced strength portion such that a fastener being threaded tip first into a workpiece is automatically separated from its sleeve while maintaining the length of the strip substantially intact and while guiding the fastener by threaded engagement of the second thread portion of the fastener in its respective sleeve.

10. A screwstrip as claimed in claim 9 wherein each fastener is received in each sleeve with the sleeve engaged about the second threaded portion, with the fastener's head extending from a rear end of the sleeve and the fastener's tip extending from a front end of the sleeve.

11. A screwstrip as claimed in claim 10 wherein each sleeve engages the shank rear of the forward thread portion of its respective fastener received therein.

12. A collated screwstrip as claimed in claim 1 wherein the first thread portion has a first axial length along the shaft and the second thread portion has a second axial length along the shaft, the second axial length being at least as great as the first axial length.

13. A screwstrip as claimed in claim 1 wherein the first thread portion and second thread portion are formed simultaneously in the same forming step by relative rotation of the fastener relative a thread-forming die having a first die-forming portion to form the first thread portion and a second die-forming portion to form the second thread portion.

14. A screwstrip as claimed in claim 1 wherein an intermediate portion of the shank between the first thread portion and the second thread portion is substantially free of threads.

15. A collated screwstrip comprising a plastic holding strip and a plurality of threaded fasteners, each fastener disposed about an axis and having a head at a rear end, a tip extending from the forward end and a shank extending from below the head to the tip about the axis, threads formed about the axis, the threads having a forward portion and a rear portion, the threads over the forward portion being of larger size than the threads over the rear portion, the threads over the forward thread portion and rear thread portion, comprising segments of the same helix about the shank of constant pitch, the holding strip holding the fasteners in a row and spaced side-by-side relation with the axis of the fasteners in a common plane and the rear thread portion of each screw in threaded engagement with the holding strip, the holding strip having where it engages each fastener a reduced strength portion such that a fastener being threaded tip first into a workpiece is automatically separated from the holding strip while maintaining a length of the strip substantially intact and while guiding the fastener by threaded engagement of the second thread portion of the fastener in the holding strip.

16. A screwstrip as claimed in claim 15 wherein the holding strip comprises an elongate beam member extending along a common side of the fastener and at least one fragible strap member extending along the other side of the fasteners.

17. A threaded fastener disposed about an axis and having a head at a rear end, a tip extending from the forward end and a shank extending from below the head to the tip about the axis, threads formed about the axis, the threads having a forward portion and a rear portion, the threads over the forward portion being of larger size than the threads over the rear portion.

18. A fastener as claimed in claim 17 wherein the threads over the forward thread portion extend radially outwardly relative the axis a greater distance than the threads over the rear thread portion.

19. A fastener as claimed in claim 17 wherein the threads over the forward thread portion have a cross-sectional area in any plane including the axis which is greater than a cross-sectional area of the threads over the rear thread portion in any plane including the axis.

20. A fastener as claimed in claim 17 wherein an intermediate portion of the shank between the first thread portion and the second thread portion is substantially free of threads.

21. A fastener as claimed in claim 17 wherein the threads over the forward thread portion and rear thread portion, comprise segments of the same helix about the shank of constant pitch.

* * * * *